United States Patent
Duan et al.

(10) Patent No.: US 11,868,245 B2
(45) Date of Patent: Jan. 9, 2024

(54) PRE-LOAD TECHNIQUES FOR IMPROVED SEQUENTIAL MEMORY ACCESS IN A MEMORY DEVICE

(71) Applicant: Micron Technology, Inc., Boise, ID (US)

(72) Inventors: Xinghui Duan, Shanghai (CN); Bin Zhao, Shanghai (CN); Jianxiong Huang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 163 days.

(21) Appl. No.: 17/272,113

(22) PCT Filed: Sep. 21, 2020

(86) PCT No.: PCT/CN2020/116462
§ 371 (c)(1),
(2) Date: Feb. 26, 2021

(87) PCT Pub. No.: WO2021/184714
PCT Pub. Date: Sep. 23, 2021

(65) Prior Publication Data
US 2022/0300409 A1     Sep. 22, 2022

Related U.S. Application Data

(63) Continuation-in-part of application No. PCT/CN2020/079414, filed on Mar. 15, 2020.

(30) Foreign Application Priority Data

Mar. 15, 2020   (WO) ................ PCT/CN2020/079414

(51) Int. Cl.
*G06F 12/02* (2006.01)
*G06F 12/06* (2006.01)
*G06F 13/16* (2006.01)

(52) U.S. Cl.
CPC ...... *G06F 12/0246* (2013.01); *G06F 12/0623* (2013.01); *G06F 13/1668* (2013.01);
(Continued)

(58) Field of Classification Search
None
See application file for complete search history.

(56) References Cited

U.S. PATENT DOCUMENTS

| | | | |
|---|---|---|---|
| 2014/0013058 A1 | 1/2014 | Hooker et al. | |
| 2015/0074328 A1* | 3/2015 | Baryudin | G06F 3/0616 711/103 |

(Continued)

FOREIGN PATENT DOCUMENTS

| | | |
|---|---|---|
| CN | 106569961 A | 4/2017 |
| CN | 107273053 A | 10/2017 |

(Continued)

OTHER PUBLICATIONS

"International Application Serial No. PCT/CN2020/079414, International Search Report dated Dec. 17, 2020", 4 pgs.

(Continued)

*Primary Examiner* — Kevin Verbrugge
(74) *Attorney, Agent, or Firm* — Schwegman Lundberg & Woessner, P.A.

(57) ABSTRACT

Devices and techniques for improving memory access operations of a memory device are provided. In an example, a method can include loading multiple LBA-to-physical address (L2P) regions of an L2P table from memory arrays of the memory device to a mapping cache in response to determining the LBA of the memory access command is not within the L2P region including of a mapping cache. When the memory access command is a sequential command, the multiple L2P regions loaded to the mapping cache can provide improved memory access performance.

20 Claims, 6 Drawing Sheets

(52) U.S. Cl.
CPC ............... *G06F 2212/7201* (2013.01); *G06F 2212/7203* (2013.01)

(56) References Cited

U.S. PATENT DOCUMENTS

| | | |
|---|---|---|
| 2015/0209936 A1 | 7/2015 | Hara et al. |
| 2015/0309936 A1 | 10/2015 | Hooker |
| 2016/0124649 A1* | 5/2016 | Liu .................. G06F 3/061 |
| | | 711/103 |
| 2017/0024145 A1 | 1/2017 | Zghal et al. |
| 2017/0024326 A1 | 1/2017 | Luo et al. |
| 2018/0088863 A1 | 3/2018 | Lee et al. |
| 2019/0155723 A1 | 5/2019 | Park et al. |
| 2020/0004430 A1* | 1/2020 | Navon .................. G06F 3/0679 |
| 2020/0004540 A1* | 1/2020 | Navon ................ G06F 12/0246 |
| 2020/0034298 A1* | 1/2020 | Benisty .............. G06F 12/0873 |
| 2020/0371940 A1* | 11/2020 | Navon ................ G06F 12/0868 |

FOREIGN PATENT DOCUMENTS

| | | |
|---|---|---|
| CN | 108319556 A | 7/2018 |
| CN | 109918023 A | 6/2019 |
| TW | 1603335 B * 10/2017 | ............. G11C 16/14 |
| WO | 2021184141 | 9/2021 |
| WO | 2021184714 | 9/2021 |

OTHER PUBLICATIONS

"International Application Serial No. PCT/CN2020/079414, Written Opinion dated Dec. 17, 2020", 4 pgs.

"International Application Serial No. PCT/CN2020/116462, International Search Report dated Dec. 28, 2020", 4 pgs.

"International Application Serial No. PCT/CN2020/116462, Written Opinion dated Dec. 28, 2020", 4 pgs.

"International Application Serial No. PCT CN2020 079414, International Preliminary Report on Patentability dated Sep. 29, 2022", 6 pages.

"International Application Serial No. PCT CN2020 116462, International Preliminary Report on Patentability dated Sep. 29, 2022", 6 pages.

* cited by examiner

PRE-LOAD TECHNIQUES FOR IMPROVED SEQUENTIAL MEMORY ACCESS IN A MEMORY DEVICE

PRIORITY APPLICATION

This application is a U.S. National Stage Application under 35 U.S.C. 371 from International Application No. PCT/CN2020/116462, filed Sep. 21, 2020, which claims the benefit of priority to International Application Serial Number PCT/CN2020/079414, filed Mar. 15, 2020, all of which are incorporated herein by reference in their entirety.

TECHNICAL FIELD

Embodiments described herein generally relate to systems and methods for improving throughput of access commands for a flash memory device.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), in various forms, such as dynamic random-access memory (DRAM) or synchronous dynamic random-access memory (SDRAM), among others. Non-volatile memory may retain stored data when not powered (may be implemented as read-only memory (ROM) in some cases), and may include one or more storage technologies, such as flash memory (e.g., NAND or NOR flash), electrically erasable programmable ROM (EEPROM), static RAM (SRAM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate, or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Access speed of memory devices is a common concern, especially as current and newer electronic devices include faster and faster processors and applications boast of faster and more accurate real-time feedback of information. As a result, improvements facilitating improved speed by a memory device can provide significant technical and practical advantages.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
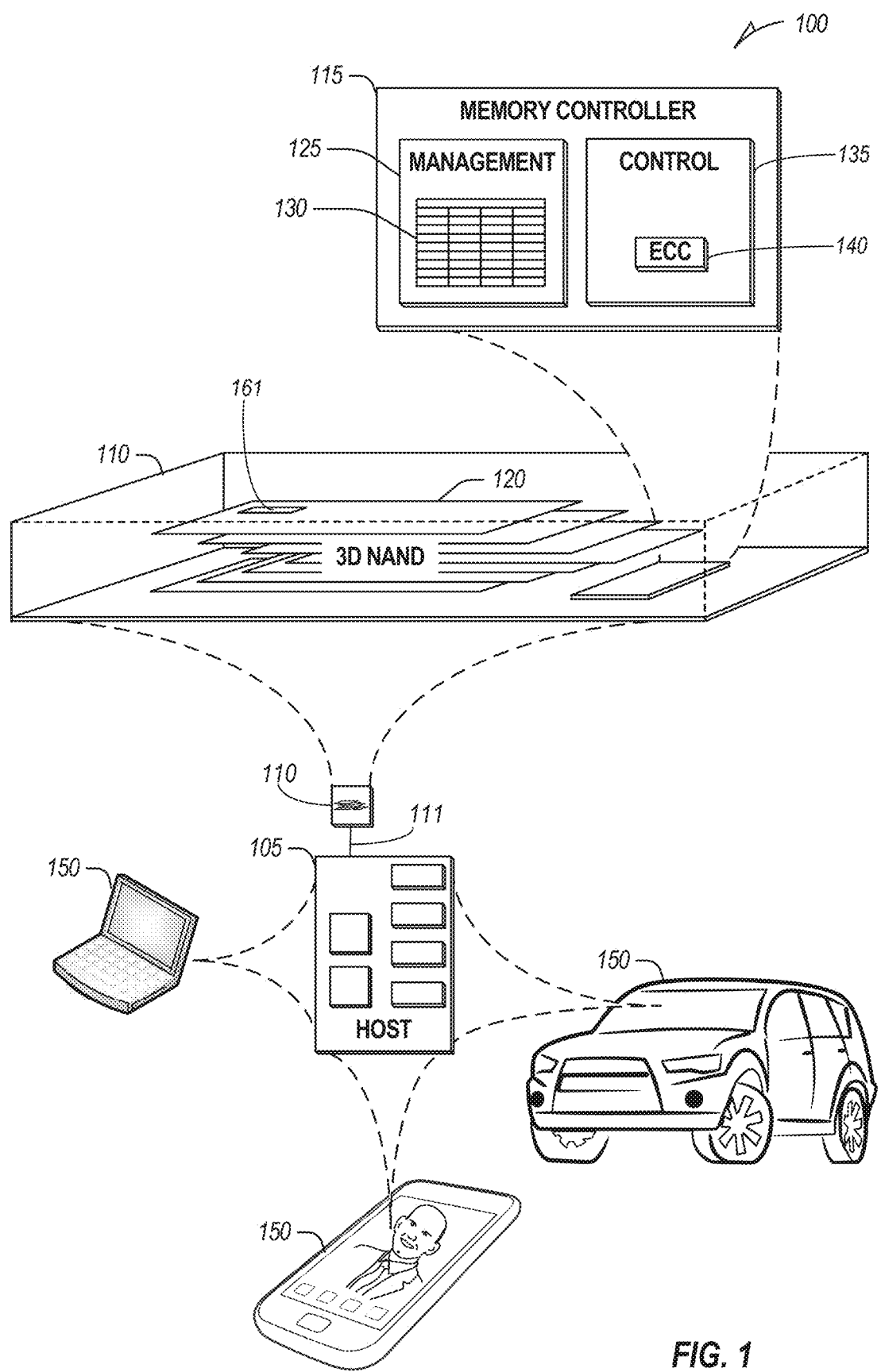
FIG. 1 illustrates a conceptualized diagram of an example of an environment including a memory device according to the present subject matter

Memory devices include individual memory die, which may, for example, include a storage region comprising one or more arrays of memory cells implementing one (or more) selected storage technologies. Such a memory die will often include support circuitry for operating the memory array(s). Other examples, sometimes known generally as "managed memory devices," include assemblies of one or more memory die associated with memory controller functionality configured to control operation of the one or more memory die. Such memory controller functionality may simplify interoperability with an external device, such as a "host" as discussed later herein, and further facilitate management of (typically) multiple discrete memory devices. In such managed memory devices, the controller functionality may be implemented on one or more die also incorporating a memory array or on a separate die. In other memory devices, one or more memory devices may be combined with memory controller functionality to form a solid-state drive (SSD) storage volume.

Example embodiments of the present disclosure are described in the example of managed memory devices implementing NAND flash memory cells, termed "managed NAND" devices. These examples, however, are not limiting on the scope of the disclosure, which may be implemented with memory devices implementing other memory storage technologies, such as the non-limiting examples previously discussed herein. Managed NAND devices may be used as primary or ancillary memory in various forms of electronic devices and are commonly used in mobile devices.

Each flash memory cell in a NOR or NAND architecture semiconductor memory array may be programmed to two or more programmed states. For example, a single-level cell (SLC) may represent one of two programmed states (e.g., 1 or 0), representing one bit of data. Flash memory cells may also represent more than two programmed states, allowing the manufacture of higher density memories without increasing the number of memory cells, as each cell may represent more than one binary digit (e.g., more than one bit). Such cells may be referred to as multi-state memory cells, multi-digit cells, or multi-level cells (MLCs). In certain examples, MLC may refer to a memory cell that may store two bits of data per cell (e.g., one of four programmed states), TLC may refer to a memory cell that may store three bits of data per cell (e.g., one of eight programmed states), and a QLC may store four bits of data per cell. MLC is used herein in its broader context, to refer to any memory cell(s) that may store more than one bit of data per cell (i.e., that may represent more than two programmed states; thus, the term MLC is used herein in the broader context, to be generic to memory cells storing 2, 3, 4, or more bits of data per cell).

Managed memory devices may be configured and operated in accordance with recognized industry standards. For example, managed NAND devices may be (as non-limiting examples), a Universal Flash Storage (UFS™) device, an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard). Similarly, identified eMMC devices may be configured in accordance with JEDEC standard JESD84-A51, entitled "JEDEC eMMC standard 5.1," and/or updates or subsequent versions to such standard. The identified standards are provided only as example environments in which the described methods and structures may be utilized, but such methods and structures may be utilized in a variety of environments outside of the identified standards (or of any other actual or proposed standards), except as expressly indicated herein.

An SSD may be used as, among other things, the main storage device of a computer; and offer advantages over traditional hard drives with moving parts with respect to, for example, performance, size, weight, ruggedness, operating temperature range, and power consumption. For example, SSDs may have reduced seek time, latency, or other delays relative to conventional magnetic disk drives. SSDs use non-volatile memory cells, such as flash memory cells, thus allowing the drive to be more versatile and compact.

Both SSDs and managed memory devices may include a number of memory devices, including a number of dies or logical units (e.g., logical unit numbers or LUNs), and typically include a memory controller, including processing circuitry, which will often include one or more processors, performing logic functions to operate the memory devices or interface with external systems. Such SSDs and managed memory devices may include one or more flash memory die, including a number of memory arrays and peripheral circuitry thereon. The flash memory arrays may include a number of blocks of memory cells organized into a number of physical pages or chunks. In some examples, the SSDs may also include DRAM or SRAM (or other forms of memory die or other memory structures), for example as part of a controller. Similarly, managed NAND devices may include one or more arrays of volatile and/or nonvolatile memory separate from the NAND storage array and either within or separate from a controller. Both SSDs and managed NAND devices may receive commands from a host in association with memory operations, such as read or write operations to transfer data (e.g., user data and associated integrity data, such as error data and address data, etc.) between the memory devices and the host, or erase operations to erase data from one or more memory devices.

The current embodiments will be described primarily in reference to managed NAND devices constructed and operated in accordance with the UFS standard. Though such managed NAND devices and the UFS standard represent only a pertinent example configuration; and the current methods and structures may be implemented with memory devices implementing other storage technologies and/or implementing other standards or operating protocols.

The present description addresses examples of memory devices, methods, and machine-readable media for managing memory device including a memory controller configured to receive instructions from a host device. The memory controller is configured to perform operations including placing the memory controller in a lower power mode during a memory management operation, and in many examples, setting a wakeup time based on a predicted completion time of the memory management operation (which may be provided by, for example, a memory communication interface that communicates with the memory array). The memory controller also operates to, toggle the memory controller out of the lower power mode upon, for example, at least one of: receipt of another memory management operation; expiration of the wakeup time; and receipt of an interrupt from one or more selected hardware resource. In sample embodiments, the memory array is a NAND memory array and the memory management operation is one of: programming a portion of the NAND memory array, erasing a portion of the NAND memory array, and reading from the NAND memory array.

FIG. 1 illustrates an example of an environment 100 including a host device 105 and a memory device 110 configured to communicate over a communication interface 111. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of 3D NAND die). In an example, the memory device 110 may be a discrete memory or storage device component of the host device 105. In other examples, the memory device 110 may be a portion of an integrated circuit (e.g., system on a chip (SOC), etc.), stacked or otherwise included with one or more other components of the host device 105. In these examples, the memory device 110 communicates with host device 105 components via communication interface 111. Thus, as described herein, a host, or host device 105 operation is distinct from those of the memory device 110, even when the memory device 110 is integrated into the host device 105.

Various forms of communication interfaces may be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 may include a host system, an electronic device, a processor, a memory card reader, or one or more other electronic devices external to the memory device 110. In some examples, the host 105 may be a machine having some portion, or all, of the components discussed in reference to the machine 1100 of FIG. 11.

The memory controller 115 may receive instructions from the host 105, and may communicate with the memory array 120, such as to transfer data to (e.g., write) or from (e.g., read), or to erase one or more of the memory cells, planes, sub-blocks, blocks, or pages of the memory array 120. For example, the memory controller 115 includes processing circuitry, which may include one or more processors which, when present, operate to execute instructions stored in the memory device. For purposes of the present examples, the instructions will be discussed as firmware, though instructions may also be present as software; and all or some portion of the described functions may also be implemented in circuitry including one or more components or integrated circuits.

For example, the memory controller 115 may include one or more memory control units, circuits, or components configured to control access across the memory array 120 and to provide a translation layer between the host 105 and the memory device 110. Additionally, the memory controller may include a memory interface to interface with the associated memory devices. In some examples, the memory interface may an Open NAND Flash Interface (ONFI). Although the memory controller 115 is here illustrated as part of the memory device 110 package, other configurations may be employed, such as the memory controller 115 being a component of the host 105 (e.g., as a discrete package on a system-on-a-chip of the host 105 that is separate from the memory service 110), or even implemented via a central processing unit (CPU) of the host 105.

The memory manager 125 may include, among other things, multiple components or integrated circuits and/or instructions for execution, associated with various memory management functions. In some embodiments, the functions of the memory manager 125 are implemented by a controller (or processor) executing the instructions of firmware which in some examples would be stored within the memory controller 115. In other examples, memory manager 125 can be implemented at least in part by one or more processors within memory controller 115, which may execute instructions stored in the memory array 120. Similarly, the management tables 130, such as mapping tables or logical block to physical address (L2P) tables can be stored on the memory controller 115 or in memory array 120. In such examples the instructions and/or management tables 130 may be stored in certain blocks of the NAND die stack 120 and loaded into the working memory of memory controller 115 during operation.

For purposes of the present description, example memory operation and management functions will be described in the context of NAND memory. Persons skilled in the art will recognize that other forms of non-volatile memory may have analogous memory operations or management functions. Such NAND management functions include wear leveling, garbage collection, reclamation, error detection or correction, block retirement, or one or more other memory management functions. The memory manager 125 may parse or format host commands (e.g., commands received from a host) into device commands (e.g., commands associated with operation of the memory array 120, etc.), or generate device commands (e.g., to accomplish various memory management functions) for the array controller 135 or one or more other components of the memory device 110. Such internally generated operations, such as garbage collection, wear leveling, etc. can result in operations being performed which can provide an opportunity for power management operations as described herein, in the same manner that externally directed memory operations provide.

The memory manager 125 may include a set of management tables 130 configured to maintain various information associated with one or more components of the memory device 110 (e.g., various information associated with a memory array or one or more memory cells coupled to the memory controller 115). For example, the management tables 130 may include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error may be referred to as an uncorrectable bit error. The management tables 130 may maintain a count of correctable or uncorrectable bit errors, among other things. In an example, the management tables 130 may include translation tables or a logical-to-physical (L2P) table or a portion thereof.

The array controller 135 may further include, among other things, circuitry or components configured to control memory operations associated with writing data to, reading data from, or erasing one or more memory cells of the memory device 110 coupled to the memory controller 115. The memory operations may be based on, for example, host commands received from the host 105, or internally generated by the memory manager 125 (e.g., in association with wear leveling, error detection or correction, etc.).

The array controller 135 may further include an error correction code (ECC) component 140, which may include, among other things, an ECC engine or other circuitry configured to detect or correct errors associated with writing data to or reading data from one or more memory cells of the memory device 110 coupled to the memory controller 115. The memory controller 115 may be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance may include removing (e.g., retiring) failing memory resources (e.g., memory cells, memory arrays, pages, blocks, etc.) to prevent future errors.

The memory array 120 may include several memory cells arranged in, for example, devices, planes, sub-blocks, blocks, or pages. As one example, a 48 GB TLC NAND memory device may include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) may include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples may include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) may be performed on larger or smaller groups of memory cells, as desired. The data transfer size of a NAND memory device 110 is typically referred to as a page, whereas the data transfer size of a host is typically referred to as a sector.

In some examples, the memory array may comprise a number of NAND dies and one or more functions of the memory controller 115 for a particular NAND die may be implemented on an on-die controller on that particular die. Other organizations and delineations of control functionality may also be utilized, such as a controller for each die, plane, superblock, block, page, and the like.

Although a page of data may include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 may provide for different page sizes or may require different amounts of metadata associated therewith. For example, different memory device types may have different bit error rates, which may lead to different amounts of metadata necessary to ensure integrity of the page of data (e.g., a memory device with a higher hit error rate may require more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device. In certain examples, the memory arrays can include a complete mapping table or L2P table 161.

Figure 2:
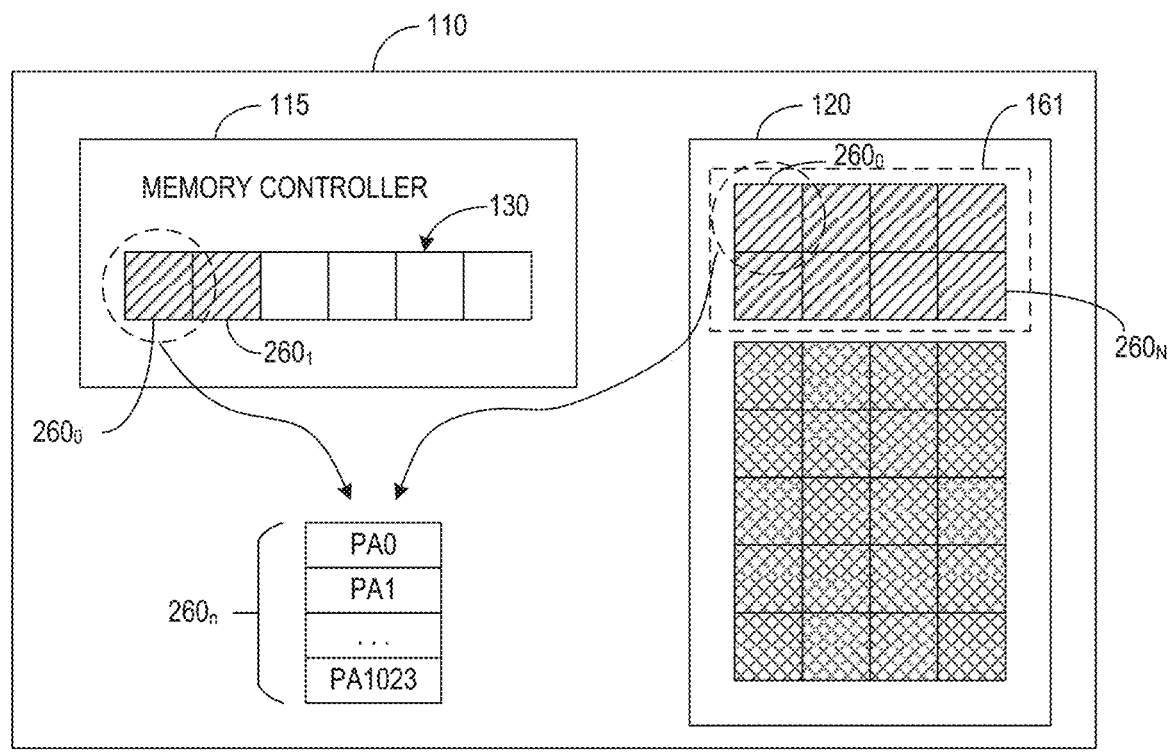
FIG. 2 illustrates generally a block diagram of mapping table data as can be located during operation of a memory device such as a UFS device according to the present subject matter.

FIG. 2 illustrates generally a block diagram of mapping table data, or L2P table data, as can be located during operation of a memory device 110 such as a UFS device. In certain examples, the complete mapping table 161 may be stored the memory array of memory device 110, and portions of the mapping table 161 may be retrieved by the memory controller 115 as needed. The mapping table 161 can be divided into multiple L2P regions 260n. In each L2P region 260n, there are physical addresses (PAs) of multiple sequential LBAs (e.g., 256 LBAs, 512 LBAs, 1024 LBAs, 2048 LBAs, etc.). The L2P region can be the basic unit that is loaded and updated from/to the flash.

For a read command, the memory controller 115 can do an LBA translation to find one or more physical addresses (Pas) of one or more LBAs associated with the read command. If the required mapping data are in an L2P cache of a management table 130 within the memory controller 115, the memory controller 115 can get the physical addresses very quickly. However, due to limited L2P cache size, the L2P cache hit rate can be very low, which means a significant amount of execution of a read command can be employed to load the proper L2P region 260n from the flash memory 120. The overhead of L2P map loading from the flash memory 120 to the L2P cache is one of the factors that can suppress read performance of the memory device 110.

As discussed above, the L2P region can be the basic unit that is transferred from the flash arrays to the L2P cache. When the proper L2P region is not available in the L2P cache to translate an LBA of a received read command (e.g., an L2P cache miss), the memory controller of a conventional memory device transfers one L2P region from the flash to the L2P cache.

Although not so limited, the L2P region size can be 2 KB or 4 KB. For a sequential read, once one L2P region is loaded from the flash to the L2P cache, the L2P region can serve 2 MB or 4 MB host read. As such, the memory controller can typically load one L2P region from the flash after every 2 MB or 4 MB host read. The overhead of loading L2P region includes read time to load L2P region from the flash, and delay time associated with memory controller overhead to schedule L2P loading task. Thus, read throughput of a conventional flash memory device can fall short of the potential top throughput speed due to the overhead of loading mapping data.

Figure 3:
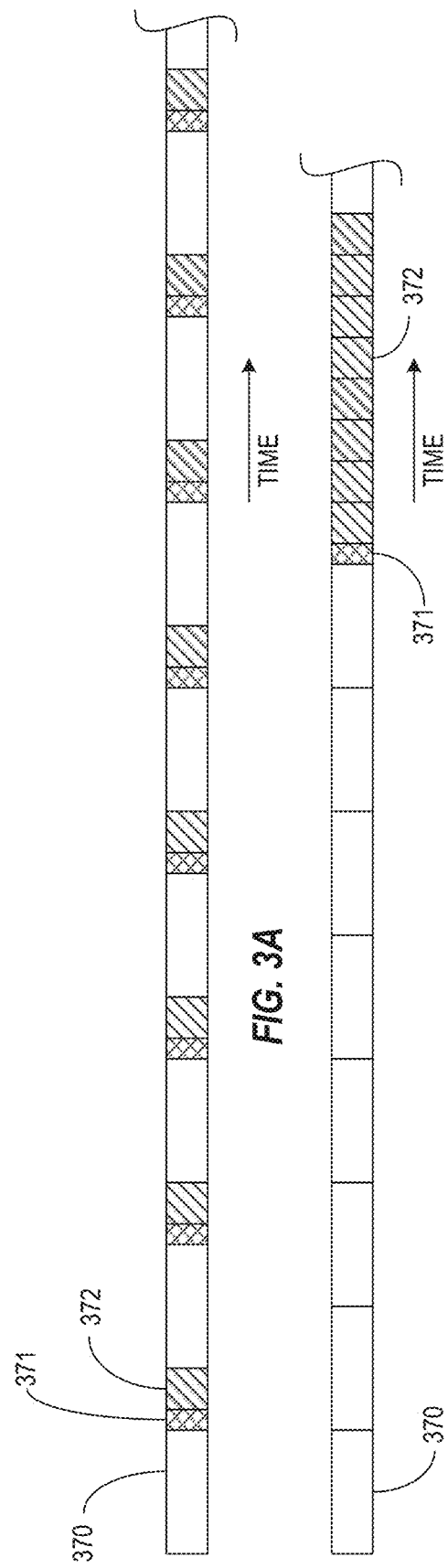
FIG. 3A illustrates generally the three main delays associated with a read command in a conventional flash device.
FIG. 3B illustrates generally an example read sequence including L2P region preloading according to the present subject matter.

FIG. 3A illustrates generally the three main delays associated with a read command in a conventional flash device as discussed above. The delays can include reading the requested data 370 such as the 2-4 MB of user data, the memory controller overhead 371 of scheduling and executing a transfer of an L2P region from the flash arrays to the L2P cache, and the delay associated with the actual transfer 372 of the L2P region from the flash arrays to the L2P cache.

FIG. 3B illustrates generally an example read sequence including L2P region preloading. To reduce the overhead of L2P region loading, in certain examples, the memory controller can pre-load multiple L2P regions for sequential reads. In certain examples, when a sequential read pattern is detected by the memory controller, the memory controller can load multiple L2P regions (e.g. 8 L2P regions) instead of only one. For example, if 8 4 KB L2P regions are loaded to the L2P cache, those regions can provide mapping to 32 MB of user data.

Referring again to FIG. 3A, for the conventional device reading 32 MB data, the memory controller schedules L2P region load task 8 times. However, a memory device according to the present subject matter that reads 32 MB of user data, as shown in FIG. 3B can schedule an L2P region load task once and can load multiple L2P regions from the flash arrays to the L2P cache to support translation of many LBAs associated with a sequential read. As such, the memory controller overhead can be reduced.

In additional, conventional devices takes $8xt_R$ ($t_R$=flash read time) to load 8 L2P regions. However, an example device using L2P region pre-loading, 8 flash read commands can be sent to the flash in batch. These commands may be distributed across all flash die. As flash commands on different die can be executed in parallel, the best case is it only take one flash read time ($t_R$) to read all 8 L2P regions. The worst case is all 8 flash read commands target to the same die, then it will take $8xt_R$ to load 8 L2P regions. Overall, the total time of loading 8 L2P regions in batch will be less than loading 8 L2P regions one by one.

Table 1 illustrates the performance improvement between operating an example memory device without pre-loading multiple L2P regions and with pre-loading multiple L2P regions for both single level cells (SLCs) and tri-level cells (TLCs).

TABLE 1

| Capacity | Flash Type | Throughput Conventional (MB/s) | Throughput w/Pre-loading (MB/s) | Improvement |
|---|---|---|---|---|
| 256 GB | SLC | 1845 | 2020 | 9.5% |
| 256 GB | TLC | 1730 | 1950 | 12.7% |

In some examples, multiple L2P region loads of the L2P cache is only when a sequential read pattern is detected.

When a sequential read pattern is not detected, the memory controller loads a single L2P region on a L2P cache miss event. In certain examples, pre-loading more L2P regions for a sequential read can improve the sequential read performance by ~10%.

Figure 4:
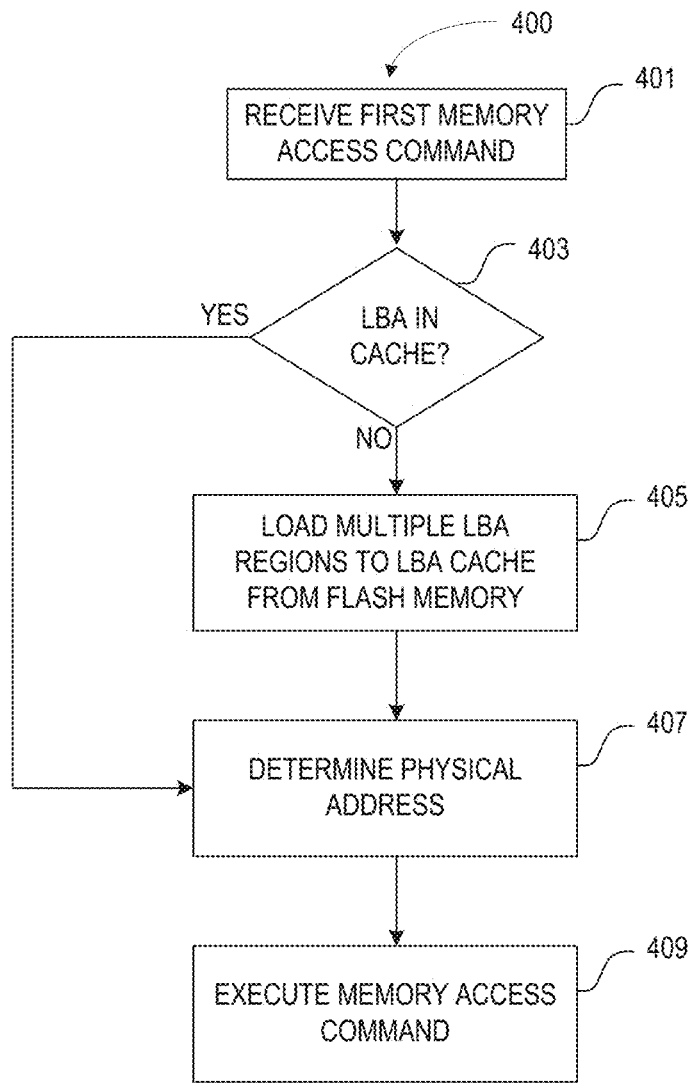
FIG. 4 illustrates generally an example method of operating a flash memory device according to the present subject matter.

FIG. 4 illustrates generally an example method 400 of operating a flash memory device. At 401, a memory controller or host interface of the flash memory device can receive a memory access command from a host. At 403, a determination can be made as to whether a first LBA received with the memory access command is indexed in an L2P region within the L2P cache, an "L2P cache hit". At 405, if the first LBA is not indexed in the portion of the LBA-to-physical address (L2P) table in the L2P cache, multiple L2P regions of the complete L2P table can be loaded from flash memory to the L2P cache. At 407, a physical address of the flash memory based on the first LBA and a L2P region of the multiple L2P regions within the L2P cache can be determined. At 409, the memory access command can be executed using the physical address. In certain examples, the loading of multiple L2P regions to the L2P cache is only executed in response to a determination that the memory access command is a sequential read command. If the memory access command is not determined to be a sequential read command, and the memory controller encounters a L2P cache miss, a single L2P region corresponding to an LBA received with the memory access command is loaded to the L2P cache from flash memory.

If the loading of multiple L2P regions to the L2P cache from the flash arrays is done in response a determination that the memory access command is a sequential read command, the memory controller can achieve higher data read throughput as subsequent read commands associated with the sequential read should not encounter L2P cache misses.

Figure 5:
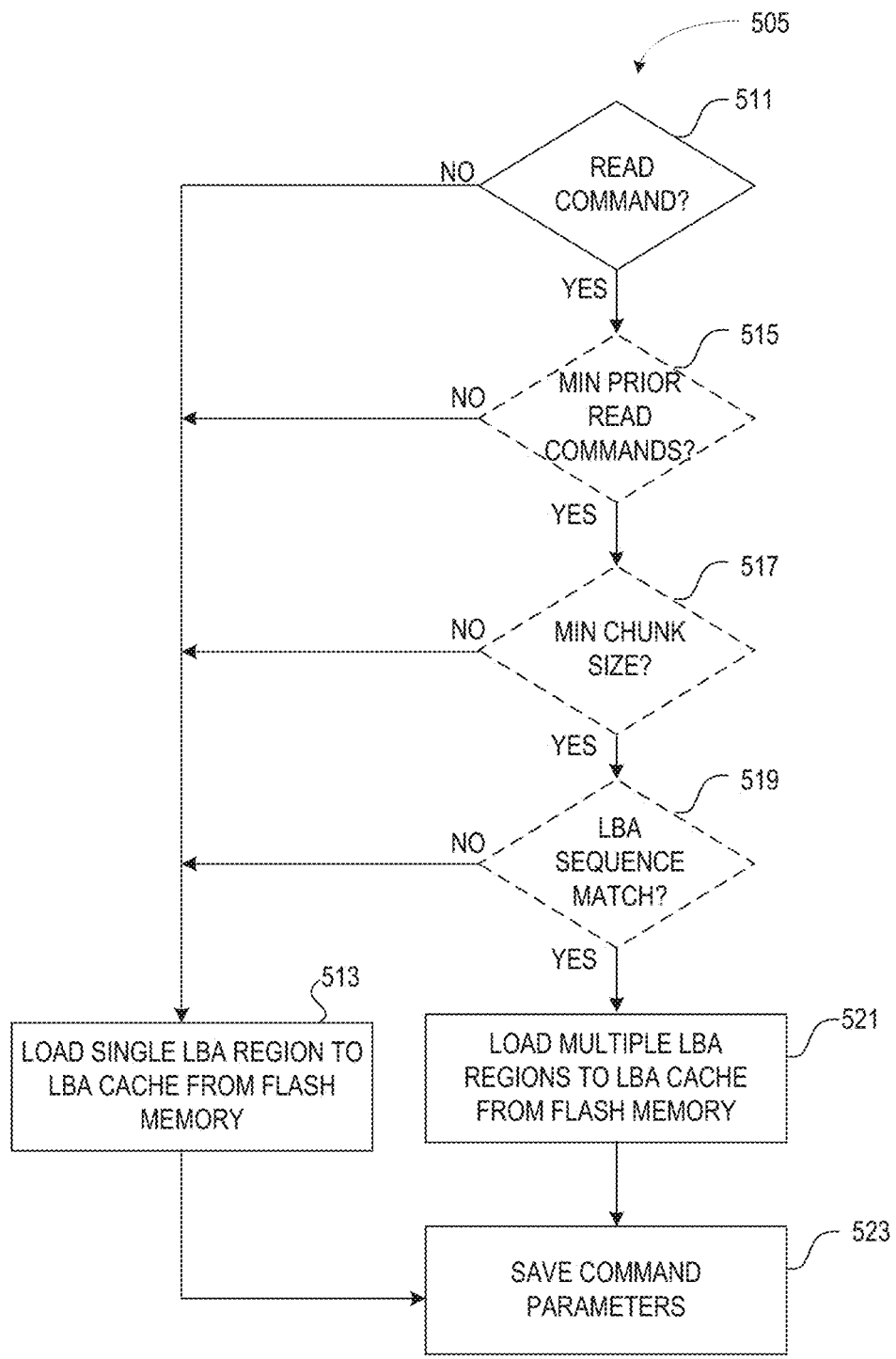
FIG. 5 illustrates generally a flowchart of an example method of loading multiple L2P regions to an L2P cache after an L2P cache miss according to the resent subject matter.

FIG. 5 illustrates generally a flowchart of an example method 505 of loading multiple L2P regions to an L2P cache after an L2P cache miss according to the resent subject matter. In certain examples, and as discussed above with respect to the method of FIG. 4, loading multiple L2P regions may only be done after a L2P cache miss and after determining the memory access command is a sequential read command such as a sequential read command over multiple L2P regions. The method 505 can be initiated at 511 in response to a L2P cache miss. At 511, the command can be evaluated to determine whether the memory access command is a read command. If the command is not a read command, the method can proceed to 513 and a single L2P region can be loaded to the L2P cache. If the current command is determined to be a read command, historical command information can be evaluated. In certain examples, if immediately preceding command was not a read command, the current command is not treated as a sequential read command. In some examples, a minimum number of immediately preceding commands (e.g., the last 4 commands) may need to be read commands before considering the current command a potential sequential read command. At 515, optionally, if a minimum number of immediately preceding commands are not read commands, the method proceeds to 513 and a single L2P region is loaded to the L2P cache. At 517, the data chunk size, or number of LBAs to be read, or length of the read data to be read, by the current read command, can optionally be evaluated against a minimum size. If the data chunk size of the current read command is not equal to or higher than the minimum size, such as the maximum chunk or page size, the method can proceed to 513 and a single L2P region is loaded to the L2P cache.

At 519, the starting LBA of the current read command can be evaluated with respect to the parameters of the immediately preceding read command. As an example, if the LBA of the preceding command plus the data chunk size of the preceding read command equal the LBA of the current read command, the current read command can be determined to be a sequential read command. In certain examples, the addition of the LBA of the preceding command and the data size of the preceding command may point to an LBA adjacent to the LBA of the current command to satisfy determining that the current read command is a sequential read command. If the evaluation of the LBAs and data chunk parameters of the current command and the preceding command do not align to support a sequential read, the method can proceed to 513 and a single L2P region is loaded to the L2P cache.

At 521, upon evaluating by one or more of steps 511, 515, 517 or 519 that the current command could be a sequential read command, multiple LBAs can be loaded to the L2P cache to support the current read command as well as any immediately subsequent read commands. At 523, parameters of the current command can be saved to provide historical command information.

Figure 6:
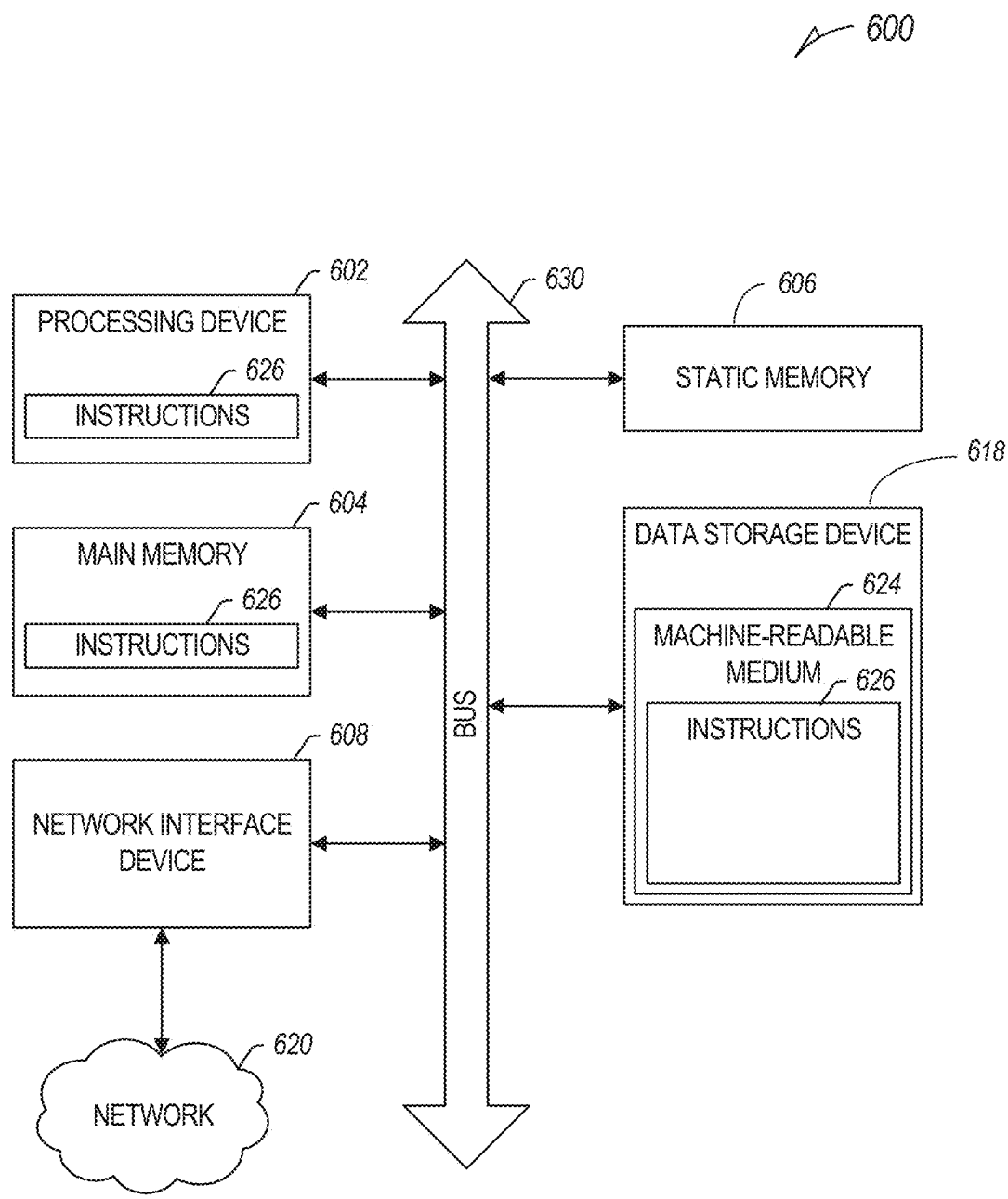
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. For example, any of the memory systems within machine 600 (main memory 604, static memory 606, and mass storage 621) may implement improved memory access command execution as discussed relative to FIGS. 1-4 herein. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110, etc.) can include a hardware processor 602 (e.g., a central processing unit (CPU), a graphics processing unit (GPU), a hardware processor core, or any combination thereof, such as the memory controller 115, etc.), a main memory Error! Reference source not found.04 and a static memory 606, some or all of which can communicate with each other via an interlink (e.g., bus) 608. The machine 600 can further include a display unit Error! Reference source not found.10, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 621, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute the machine readable medium 622.

While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE)

802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL EXAMPLES

In Example 1, a method can include receiving a memory access command from a host, determining an L2P region including a first LBA received with the memory access command is not within a mapping cache, loading multiple L2P regions of a LBA-to-physical address (L2P) table from flash memory to the mapping cache in response to determining the L2P region including the LBA of the memory access command is not within the mapping cache, determining a physical address of the flash memory based on the first LBA and a first L2P region of the multiple L2P regions within the mapping cache, and executing the memory access command.

In Example 2, the method of Example 1 optionally includes receiving a second memory access command, and determining a second L2P region of the mapping cache includes a second LBA received with the second memory access command.

In Example 3, the method of any one or more of Examples 1-2 optionally includes, after the receiving the second memory access command, executing the second memory access command without first transferring a portion of the L2P table from the flash memory to the mapping cache.

In Example 4, the receiving the memory access command of any one or more of Examples 1-3 optionally includes determining the memory access command is a sequential read command.

In Example. 5, the determining the memory access command is a sequential read command of any one or more of Examples 1-4 optionally includes determining the memory access command is a read command.

In Example 6, the determining the memory access command is a sequential read command of any one or more of examples 1-5 optionally includes determining multiple immediately prior memory access commands were exclusively read commands.

In Example 7, the determining the memory access command is a sequential read command of any one or more of Examples 1-5 optionally includes determining the memory access command is a read command with a data chunk size equal to a maximum data chunk size.

In Example 8, the determining the memory access command is a sequential read command of any one or more of Examples 1-7 optionally includes determining a sum of a starting LBA from an immediately prior read command and a data chunk size of the immediately prior read command point to a starting LBA of the memory access command.

In Example 9, an L2P region of the LTP table of any one or more of Examples 1-8 optionally is configured to map more than 1000 LBAs to a corresponding physical address of the flash memory.

In Example 10, the loading multiple L2P regions of any one or more of Examples 1-9 optionally includes loading at least three L2P regions of the L2P table from the flash memory to the memory cache.

In Example 11, a memory device can include a memory array, such as a flash memory array, and a memory controller. The memory controller can be configured to receive commands from a host device. The memory controller can include processing circuitry including one or more processors, and can be configured to perform operations including: receiving a memory access command from a host, determining an L2P region including a first LBA received with the memory access command is not within mapping cache, loading multiple L2P regions of a LBA-to-physical address (L2P) table from flash memory to the mapping cache in response to determining the L2P region including the LBA of the memory access command is not within the mapping cache, determining a physical address of the flash memory based on the first LBA and a first L2P region of the multiple L2P regions within the mapping cache, and executing the memory access command.

In Example 12, the operations of the memory device of any one or more of Examples 1-11 optionally include receiving a second memory access command and determining a second L2P region of the mapping cache includes a second LBA received with the second memory access command.

In Example 13, the operations of the memory device of any one or more of Examples 1-12 optionally include, after the receiving the second memory access command, executing the second memory access command without first transferring a portion of the L2P table from the flash memory to the mapping cache.

In Example 14, the operations of the memory device of any one or more of Examples 1-13 optionally include determining the memory access command is a sequential read command.

In Example 15, the determining the memory access command is a sequential read command of any one or more of Examples 1-14 optionally includes determining the memory access command is a read command.

In Example 16, the determining the memory access command is a sequential read command of any one or more of examples 1-15 optionally includes determining multiple immediately prior memory access commands were exclusively read commands.

In Example 17, the determining the memory access command is a sequential read command of any one or more of Examples 1-16 optionally includes determining the memory access command is a read command with a data chunk size equal to a maximum data chunk size.

In Example 18, the determining the memory access command is a sequential read command of any one or more of Examples 1-17 optionally includes determining a sum of a starting LBA from an immediately prior read command and a data chunk size of the immediately prior read command point to a starting LBA of the memory access command.

In Example 19, an L2P region of the LTP table of any one or more of Examples 1-18 optionally include is configured to map more than 1000 LBAs to a corresponding physical address of the flash memory.

In Example 20, the operation of loading multiple L2P regions of any one or more of Examples 1-19 optionally include includes loading at least three L2P regions of the L2P table from the flash memory to the memory cache.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method performed by a memory device, the method comprising:
    receiving a first memory access command from a host, the first memory access command to access a memory array of the memory device;
    determining that the first memory access command is a sequential read command;
    determining whether an LBA-to-physical address (L2P) region of an L2P cache includes a first LBA received with the first memory access command;
    in response to determining the first LBA of the first memory access command is not within the L2P cache and that the first memory access command is a sequential read command, performing one load of multiple L2P regions of an L2P table from the memory array to the L2P cache;
    determining a first physical address of the memory array based on the first LBA and at least a first L2P region of the multiple L2P regions within the L2P cache; and
    executing the first memory access command based on the first physical address.

2. The method of claim 1, including:
    receiving a second memory access command; and
    determining that the L2P cache includes a second LBA received with the second memory access command.

3. The method of claim 2, including, after receiving the second memory access command, executing the second memory access command without first transferring a further region of the L2P table from the memory array to the L2P cache.

4. The method of claim 1, wherein determining the first memory access command is a sequential read command further comprises determining that multiple immediately prior memory access commands were exclusively read commands.

5. The method of claim 1, wherein determining the first memory access command is a sequential read command further comprises determining the first memory access command is a read command with a data chunk size equal to a maximum data chunk size.

6. The method of claim 1, wherein determining the first memory access command is a sequential read command further comprises determining that a sum of a starting LBA of an immediately prior read command and a data chunk size of the immediately prior read command extend to a starting LBA of the first memory access command.

7. The method of claim 1, the memory device is a flash memory device and the memory array is a flash memory array, and wherein an L2P region of the L2P table is configured to map more than 1,000 LBAs to a corresponding physical address of the flash memory array.

8. The method of claim 1, wherein the loading multiple L2P regions includes loading at least three L2P regions of the L2P table from the memory to the memory L2P cache.

9. The method of claim 1, wherein determining that the first memory access command is a sequential read access comprises determining whether an LBA of an immediately preceding read command plus a data chunk size of the immediately preceding read command equals the LBA of the first memory access command.

10. A memory device comprising:
    a memory array; and
    a memory controller configured to receive commands from a host device, the memory controller including processing circuitry including one or more processors, and is configured to perform operations including:
        receiving a first memory access command from a host, the first memory access command to access the memory arrays of the memory device;
        determining that the first memory access command is a sequential read command;

determining whether an LBA-to-physical address (L2P) region of an L2P cache includes a first LBA received with the first memory access command;

in response to determining that the L2P cache does not include the first LBA of the first memory access command, and that the first memory access command is a sequential read command, performing one load of multiple L2P regions of an L2P table from the memory array to the L2P cache;

determining a first physical address of the memory array based on the first LBA and a first L2P region of the multiple L2P regions within the L2P cache; and executing the first memory access command based at least in part on the first physical address.

11. The memory device of claim 10, wherein the operations include:

receiving a second memory access command; and determining a second L2P region of the L2P cache includes a second LBA received with the second memory access command.

12. The memory device of claim 11, wherein the operations include, after receiving the second memory access command, executing the second memory access command without first transferring a further portion of the L2P table from the memory array to the L2P cache.

13. The memory device of claim 10, wherein determining that the first memory access command is a sequential read command includes determining multiple immediately prior memory access commands were exclusively read commands.

14. The memory device of claim 10, wherein determining the first memory access command is a sequential read command includes determining that the first memory access command is a read command with a read data length equal to a maximum read data length.

15. The memory device of claim 10, wherein determining the first memory access command is a sequential read command includes determining a sum of a starting LBA from an immediately prior read command and a read data length of the immediately prior read command extends to a starting LBA of the first memory access command.

16. The memory device of claim 10, wherein the memory device is a flash memory device and the memory array is a flash memory array, and wherein an L2P region of the L2P table is configured to map more than 1,000 LBAs to a corresponding physical address of the flash memory array.

17. The memory device of claim 10, wherein the operation of loading multiple L2P regions includes loading at least three L2P regions of the L2P table from the memory array to the L2P cache.

18. The memory device of claim 10, wherein determining that the first memory access command is a sequential read access comprises determining whether an LBA of an immediately preceding read command plus a data chunk size of the immediately preceding read command equals the LBA of the first memory access command.

19. The memory device of claim 10, wherein determining that the first memory access command is a sequential read access comprises determining that a selected number of immediately preceding memory access commands were read commands.

20. The memory device of claim 10, wherein executing the first memory access command based on the first physical address, comprises sending multiple read commands to the memory array in batch.

* * * * *